United States Patent [19]

Saund

[11] Patent Number: 5,528,290
[45] Date of Patent: Jun. 18, 1996

[54] DEVICE FOR TRANSCRIBING IMAGES ON A BOARD USING A CAMERA BASED BOARD SCANNER

[75] Inventor: Eric Saund, San Carlos, Calif.

[73] Assignee: Xerox Corporation, Stamford, Conn.

[21] Appl. No.: 303,918

[22] Filed: Sep. 9, 1994

[51] Int. Cl.[6] .................................................. H04N 5/225
[52] U.S. Cl. .............................................. 348/218; 382/284
[58] Field of Search .................................... 348/218, 143, 348/159, 362, 373; 382/41, 44, 45, 284, 293, 295

[56] References Cited

U.S. PATENT DOCUMENTS

| | | | |
|---|---|---|---|
| 4,797,942 | 1/1989 | Burt | 382/41 |
| 5,010,500 | 4/1991 | Makkuni et al. | 364/521 |
| 5,063,602 | 11/1991 | Peppers et al. | 382/32 |
| 5,140,647 | 8/1992 | Ise et al. | 382/41 |
| 5,298,697 | 3/1994 | Suzuki et al. | 382/41 X |
| 5,331,435 | 7/1994 | Scott | 348/373 |
| 5,353,058 | 10/1994 | Takei | 348/362 X |

OTHER PUBLICATIONS

Szeliski, R., "Image Mosaicing for Tele-Reality Applications," Digital Equipment Corporation, Cambridge Research Lab., CRL 94/2, May, 1994.
Quentin, S—F., "Controlling Computers by Video," First Year Report & Project Proposal, Jul. 23, 1993, Rank Xerox Limited, Cambridge EuroPARC, UK.

Primary Examiner—Wendy Greening
Attorney, Agent, or Firm—R. Christine Jacobs; Tracy L. Hurt

[57] ABSTRACT

A device for transcribing, into electronic form, markings drawn on a whiteboard or blackboard. An electronic camera such as an ordinary video camera is mounted on a computer-controlled pan/tilt head in the ceiling or to the side of the board. Images are captured by directing the camera successively at small regions of the board, then processing these snapshots electronically, leading to a complete, undistorted, high-resolution image of the entire board.

10 Claims, 9 Drawing Sheets

DEVICE FOR TRANSCRIBING IMAGES ON A BOARD USING A CAMERA BASED BOARD SCANNER

CROSS REFERENCE TO RELATED APPLICATIONS

This application is a related to U.S. patent application Ser. No. 08/303,929, and U.S. patent application Ser. No. 08/303,962, both coassigned and concurrently filed, and incorporated by reference herein.

FIELD OF THE INVENTION

The present invention relates to a device for transcribing markings on a whiteboard or blackboard device into electronic form.

More specifically, the invention relates to techniques for capturing images from a board and processing these images electronically to produce a complete, undistorted, high-resolution image of the entire board.

BACKGROUND OF THE INVENTION

In collaborative working environments, several users frequently wish to view and manipulate displayed information simultaneously. Whiteboards and Blackboards (hereafter referred to as "Boards") are widely used to maintain hand drawn textual and graphic images on a "wall-size" surface. The Board medium offers certain properties that facilitate a variety of interactive work practices: markings are large enough to be viewed by several people; markings can be edited by erasing and redrawing; the surface is immobile, so does not get lost, crumpled, torn, or blown by wind; the surface is readily erased, is completely reusable, and (practically) does not wear out. However, one drawback to using a Board is that information is not easily transferred to other media. Thus, it is not currently possible to hold a conversation with someone while maintaining a record of the conversation in text and graphics on a Board and then quickly, easily, and automatically transfer the record to paper or other portable and storable medium.

Existing methods for accomplishing this task are cumbersome, time-consuming, and inconvenient. One can simply transcribe by hand, onto paper, any or all of the text and graphics residing on the Board. This can be time-consuming, and suffers from errors due to mistakes in human reading and writing. Or, one can photograph the Board with a camera. This requires having a camera at hand, introduces the delay of developing the film, can be expensive if an "instant" camera is used, is subject to poor quality rendition due to improper focus and exposure. A camera further usually produces an image of greatly reduced size that can be difficult to read.

Alternatively, "wall-size" sheets of paper, such as poster pads, lead to a relatively permanent and portable record of what was written, but these sheets of paper are large and cumbersome, and do not permit erasure during image creation.

A copy-board device provides a writing surface which can be transcribed into paper hardcopy, but these are currently conceived as conspicuous portable whiteboards that displace rather than leverage existing, built-in Boards.

The solutions discussed above further do not aid in transferring the image from the Board into an electronically usable form.

In the present invention, a high-resolution electronic image of a Board is provided without significant distortion by a camera-based scanning system.

SUMMARY OF THE INVENTION

The present invention provides a system for capturing in computational form the image content of an image on a board. The system includes a board upon which is provided a board image, at least one camera subsystem for capturing the board image in a series of overlapping image tiles, and a processor for receiving and processing the image tiles to combine the tiles in a complete binary image representing the board image, with memory to store the intermediate image data and resulting binary image.

The invention further provides a method for providing a complete undistorted computational representation of an image on a board by capturing overlapping image tiles each containing a portion of the board image, and converting the image tiles into electronically computational format. Corrections are made to each tile to correct for lightness variation across each tile. The overlapping area is determined and correction is made for said overlap to produce a single intermediate grey-level image. The grey-level representation of the image is thresholded to produce a binary electronic image representing the image on the board. Alternatively, the grey-level image may be processed to produce colored images as well.

One object of this invention is to provide human users with the ability to capture in a computational form the image content of existing Boards, providing a complete undistorted high-resolution computational image of marks on the board. Once in electronic form, the image can be hardcopied, transmitted by fax, stored to a file, transferred to a display device, and/or further processed, using image analysis techniques, to filter and analyze the information content.

The following description, the drawings and the claims further set forth these and other objects, features and advantages of the invention.

DETAILED DESCRIPTION

Figure 1:
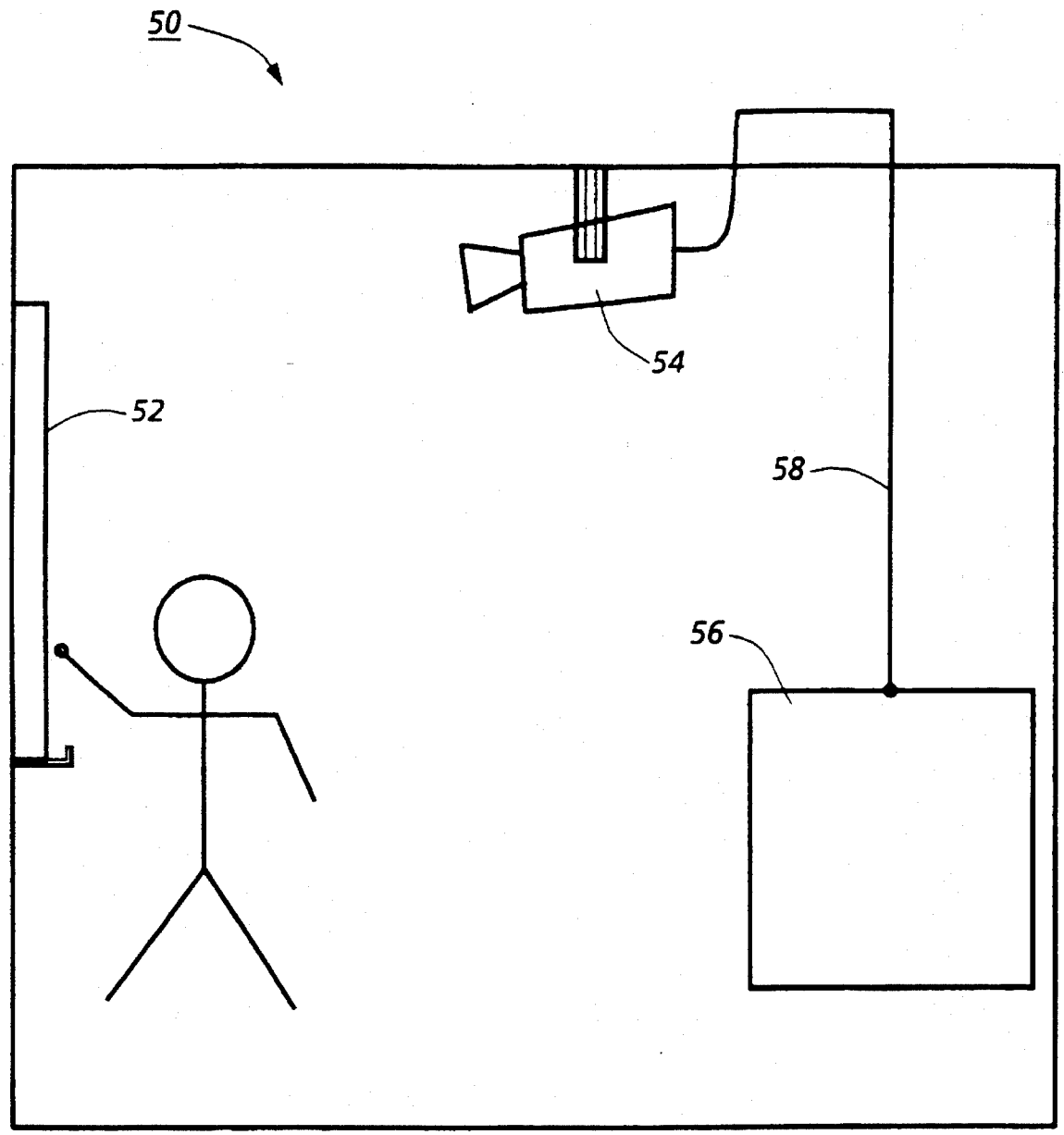
FIG. 1 shows a system employing the features of the present invention.

FIG. 1 shows a system 50 describing the features of the present invention. A board 52 accepts markings from a user. A "Board" may be either a whiteboard, blackboard or other similar wall-sized surface used to maintain hand drawn textual and graphic images. The description following is based primarily on a whiteboard with dark colored markings. It will be clear to those of skill in the art that a dark colored board with light colored marking may also be used, with some parameters changed to reflect the opposite reflectivity.

Camera subsystem 54 captures an image or images of the Board, which are fed to computer 56 via a network 58. Computer 56 includes a processor and memory for storing instructions and electronic and computational images.

In general, the resolution of an electronic camera such as a video camera will be insufficient to capture an entire Board image with enough detail to discern the markings on the Board clearly. Therefore, several zoomed-in images of smaller subregions of the Board, called "image tiles," must be captured independently, and then pieced together.

Camera subsystem 54 is mounted on a computer-controlled pan/tilt head 55, and directed sequentially at various subregions, under program control, when an image capture command is executed. Camera subsystem 54 may alternately comprise an array of fixed or rotatable cameras, each directed at a different subregion or subregions. For the discussion herein, camera subsystem 54 may be referred to as simply camera 54.

The "raw" image tiles will in general overlap one another, contain perspective distortion due to the off-axis viewpoint of the camera, and contain uneven lightness levels across the board between foreground (written marks) and background (unmarked board) due to uncontrolled lighting conditions and reflections.

The following figures describe a general method of performing techniques of the invention to compensate for the above described effects.

Figure 2:
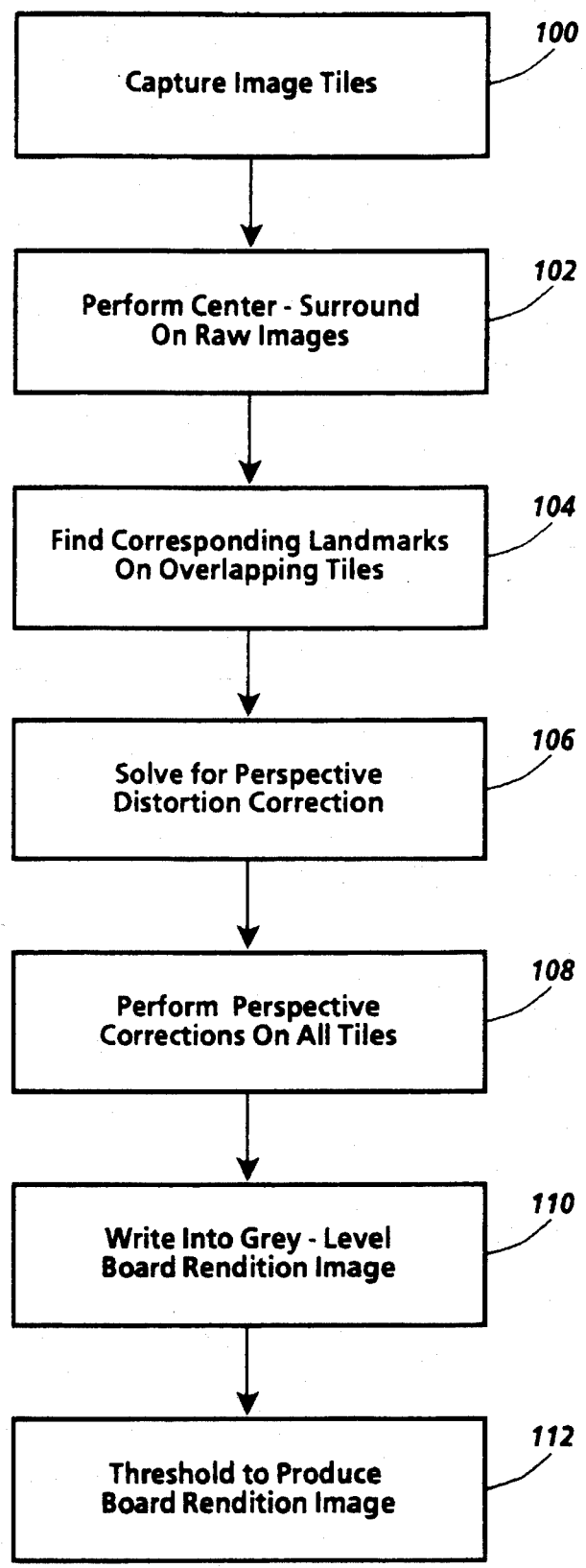
FIG. 2 shows a flowchart for the general method for producing a binary rendition of the Board from a set of scanned image sections.
Figure 3:
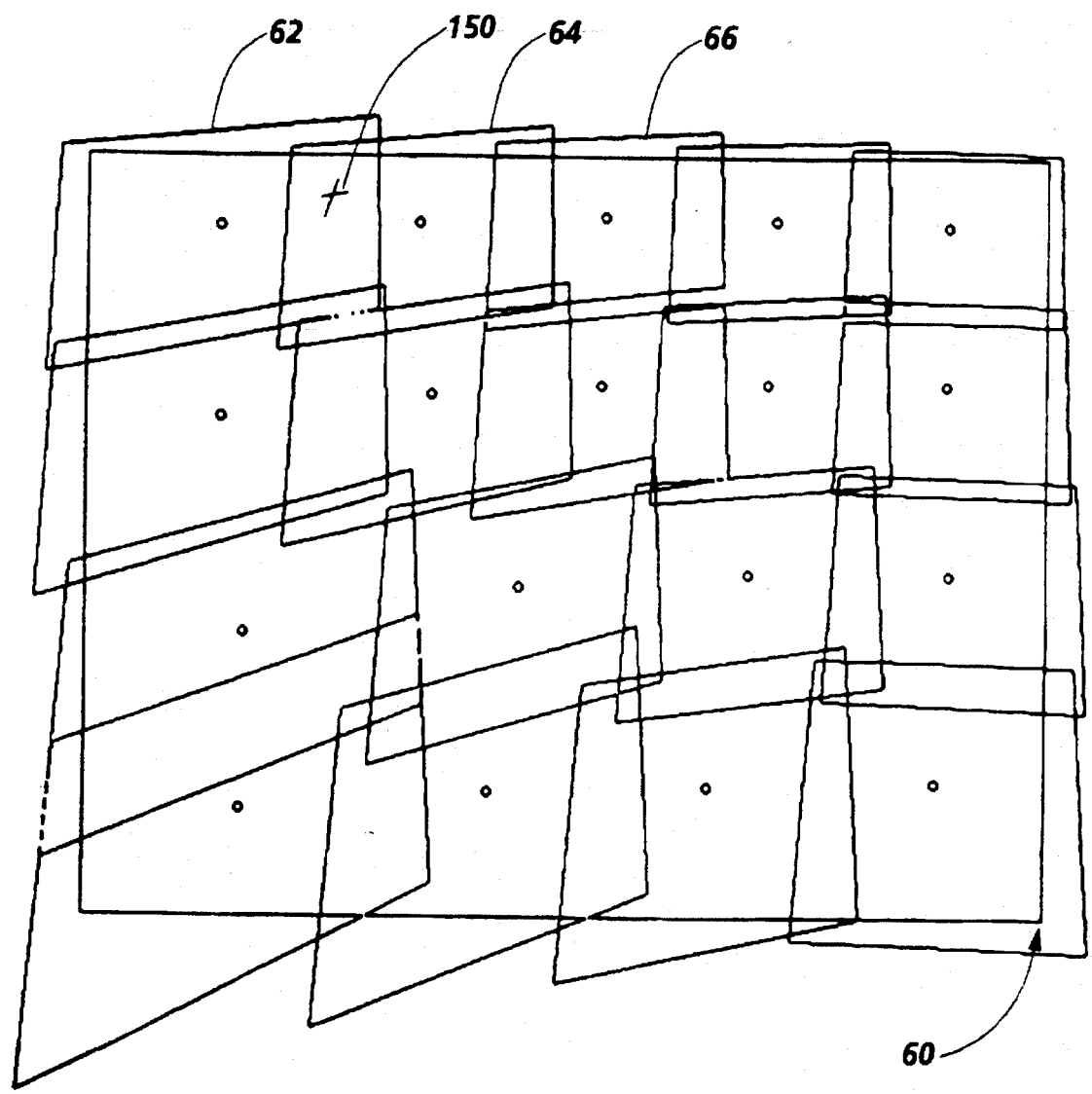
FIG. 3 shows image tiles on a board scanned by a camera.

The flowchart of FIG. 2 shows the general method for producing a binary rendition of the Board from a set of scanned image sections. In step 100, the scanned image sections are captured as "tiles." Each tile is a portion of the image scanned by a camera, as shown in FIG. 3. A Board 60 is captured as a series of tiles 62, 64, etc. The tiles slightly overlap with neighboring tiles, so that the entire image is scanned with no "missing" spaces. The location of each tile is known from the position and direction of the camera on the pan/tilt head when the tile is scanned. The tiles may be described as "raw image" or "camera image" tiles, in that no processing has been done on them to either interpret or precisely locate them in the digital image. A mark 150 on board 60 is captured in two adjacent tiles 62 and 64.

Figure 4:
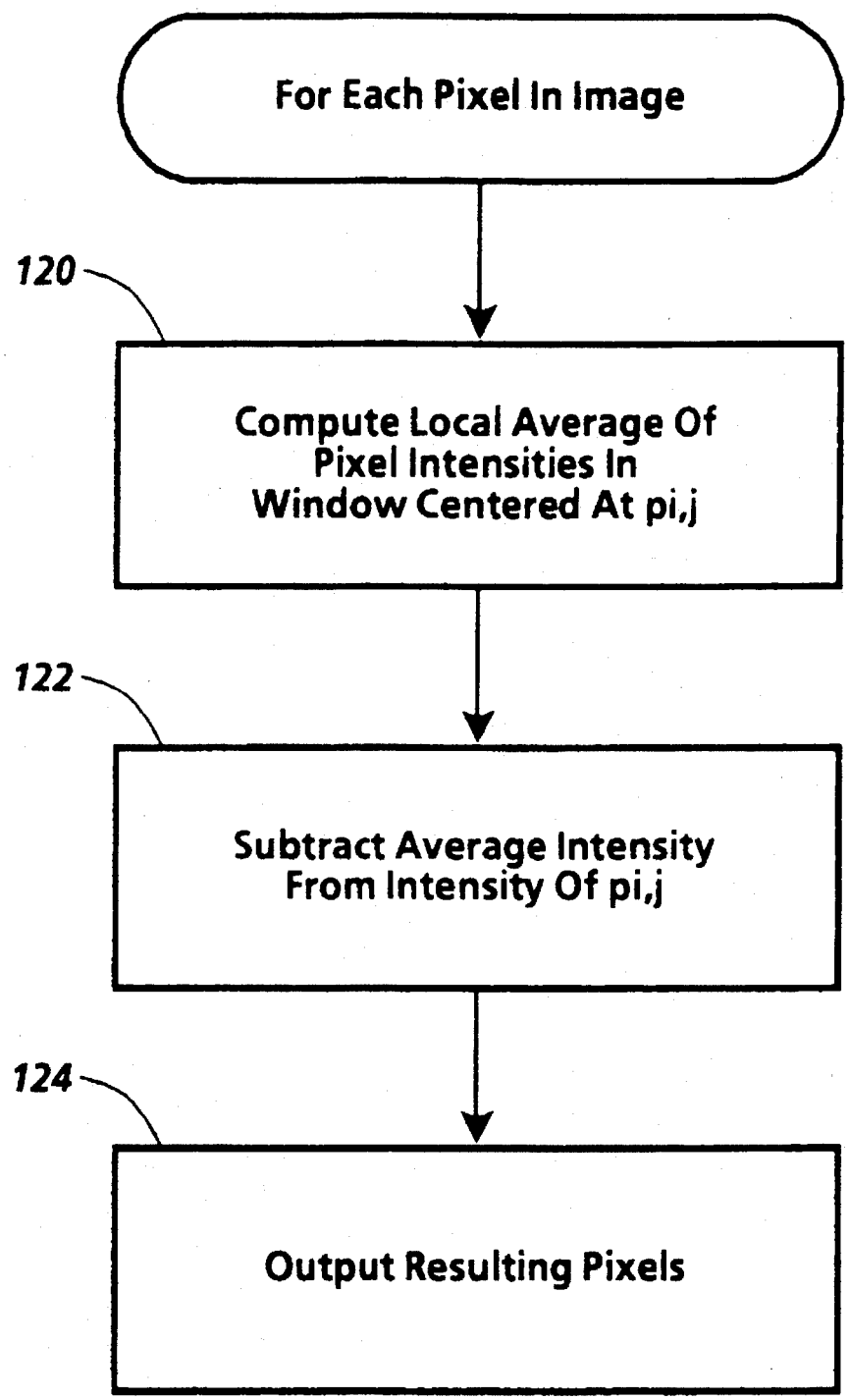
FIG. 4 shows a flowchart describing center-surround processing.

Returning to FIG. 2, in step 102 center-surround processing is performed on each camera image tile. Center-surround processing compensates for the lightness variations among and within tiles. The center-surround processing technique will be described in relation to FIG. 4. For each pixel in the image, step 120 computes a local average of pixel intensities in a window, of a prespecified size, centered at $p_{i,j}$. In step 122, the average intensity is subtracted from each $p_{i,j}$. The resulting pixels are output in step 124. The resulting output pixels represent the difference at each pixel between its original value and the average value of pixels in the surrounding area.

Returning again to FIG. 2, step 104 finds corresponding "landmarks" in overlapping tiles, as will be described in relation to FIG. 5. "Landmarks" are described as marks on the Board which appear in at least two tiles, and may be used to determine the overlap position of adjacent neighboring tiles. FIG. 6 shows two examples of marks that may be used as landmarks. Landmarks may be defined by starting points, end points, and crossing points in their makeup.

Landmarks are detected in two stages. The first stage entails the creation of an auxiliary "landmark quality" image indicating the "goodness" of a potential landmark centered at each pixel in the image. A "good" landmark provides precise localization in two directions, such as mark 150. A "secondary" landmark, such as mark 160, provides localization in only one direction, providing localization in the direction of arrow 165, but less precise localization in the other direction, designated by arrow 163. The second stage is the selection of good landmarks as uniformly as possible within the overlap region between the projection of two image tiles in the Board coordinate system.

To obtain the auxiliary landmark quality image, a gradient operator first is applied to the raw image, whereby the rough orientation and magnitude of the gradient are recorded at each pixel, using techniques that will be well-known to those familiar with computer vision literature.

Local orientation is quantized into four bins. So for each pixel in the image a local histogram is formed giving cumulative gradient magnitude for each of the orientation bins, within a localized neighborhood of each pixel. Note that for good landmarks the histogram will contain large cumulative gradient magnitude in all orientation bins, secondary landmarks will contain large gradient magnitude in at most two bins, and poor or nonexistent landmarks will contain large cumulative gradient magnitude in no bins. Finally, each pixels is scored as to local landmark quality according to:

$$\text{landmark-quality} = v_m v_p + v_m + v_p$$

where $v_m$ is the gradient magnitude in the histogram bin with the greatest cumulative gradient magnitude and $v_p$ is the gradient magnitude in the histogram bin representing the orientation 90 degrees from the bin of $v_m$.

In the the second stage of landmark detection the landmark-quality image is scanned with the objective of obtaining roughly uniformly distributed locations representing high quality landmarks. The landmark-quality image is divided into square patches of predetermined size referred to as the "landmark-radius." Within each such patch, each pixel is given a "weighted-landmark-quality" score by $$\text{weighted-landmark-quality} = \text{landmark-quality} + 2\text{landmark-radius} - |d_x| - |d_y|$$

where $d_x$ and $d_y$ are the distance of the pixel to the center of the square patch in the horizontal and vertical directions, respectively. Within each patch, the pixel with the greatest weighted-landmark-quality is found. If the landmark-quality associated with this pixel falls above a predetermined threshold, then this pixel location is accepted as a landmark.

Figure 5:
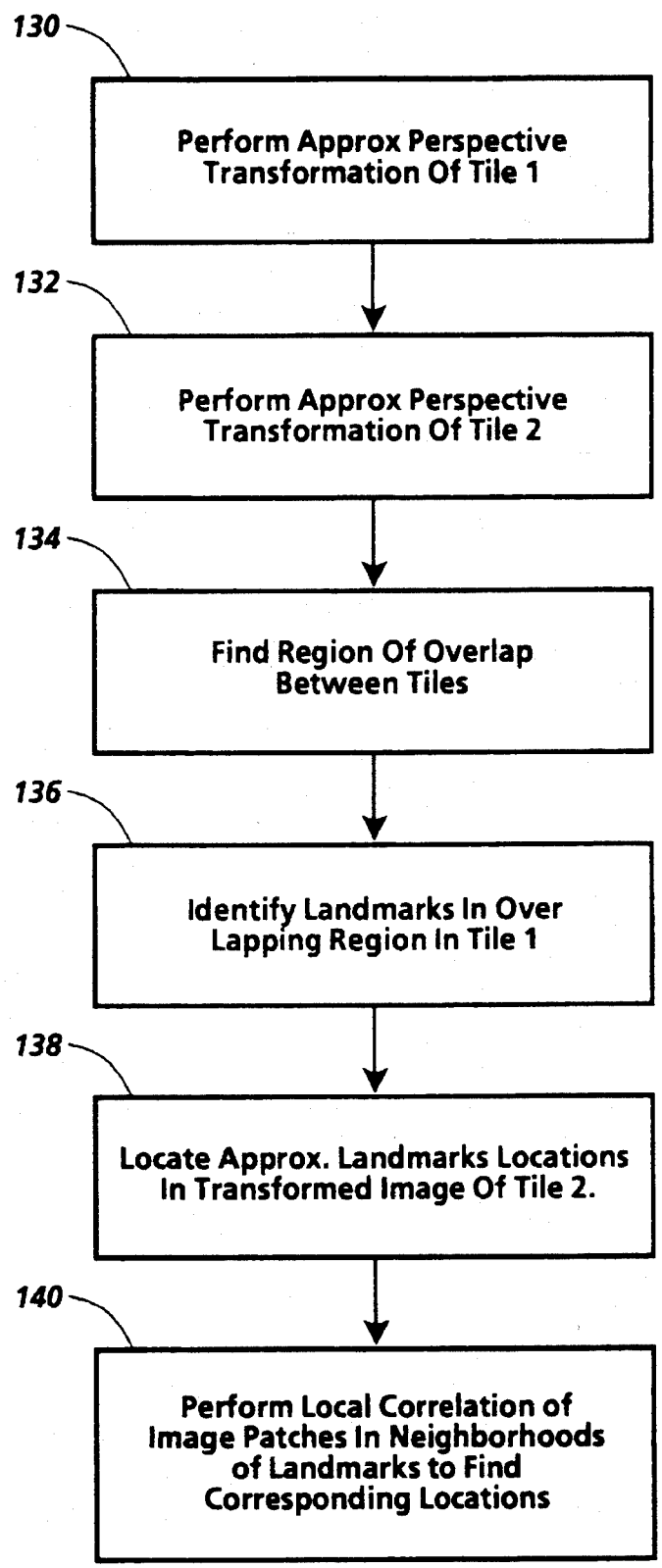
FIG. 5 shows a flowchart describing finding corresponding landmarks in two overlapping tiles.
Figure 6:
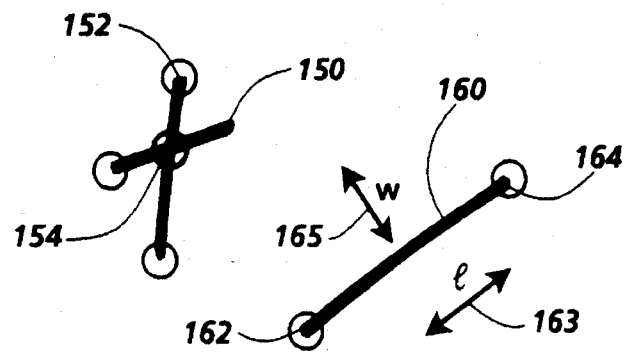
FIG. 6 shows two examples of marks that may be used as landmarks.

FIG. 5 describes finding corresponding landmarks in two overlapping tiles, which shall be referred to as tile 1 and tile 2. In step 130 of FIG. 5, an approximate perspective transformation of tile 1 is performed to determine approximately how the tile maps into Board coordinates. This comes from dead reckoning based on camera calibration and the positioning of the pan/tilt head when this image was captured. The transformation may be determined using a general linear transformation in homogeneous coordinates, as described in "Geometric Invariance in Computer Vision," edited by Mundy and Zisserman, ©1992 Massachusetts Institute of Technology, Appendix 23.4.5–23.4.7, pages 481–484. Board coordinates are predefined with respect to the Board. When the camera is calibrated, each tile location is determined in Board coordinates. A similar transformation is performed in step 132 on tile 2.

In step 134, the region of overlap, in Board coordinates, between tiles 1 and 2 is found based on the dead reckoning. Landmarks that fall in this overlapping region in the transformed image of tile 1 are identified in step 136, and in step 138 the approximate locations of the landmarks in the transformed image of tile 2 are located.

Figure 7:
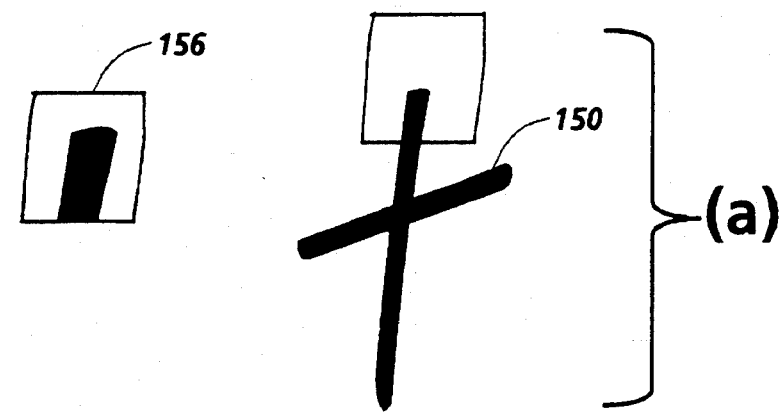
FIG. 7 illustrates determination of confidence rectangle.
Figure 7:
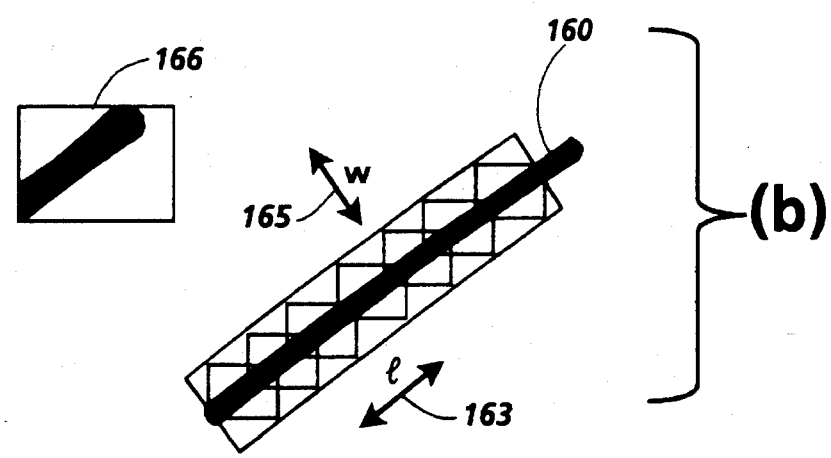

In step 140, a local correlation is performed on image patches in the neighborhoods of landmarks to find locations in tile 2 corresponding to landmark locations in tile 1. This correlation further determines an oriented rectangle which incorporates two confidence levels in the localization of the mark. FIG. 7 illustrates this determination of confidence level. As described previously, mark 150 constitutes a "good" landmark. Template 156 is an image patch surrounding a pixel of the mark in the first tile, used to determine the orientation and location of landmark 150. When patch 156 is correlated with mark 150 in the image tile, it matches the mark closely in two directions, creating only a very small region of match. This "correlation rectangle," describing the amount of match between the patch of the landmark in tile 1 and the landmark in tile 2, helps to determine the confidence in the location of the mark in the tiles.

Alternatively, with landmark 160, which has previously been described as a secondary landmark, it can be seen that an image patch around a pixel of mark 160, template 166, could match in a number of locations along the lengthwise axis of mark 160. The confidence in the localization is determined along the axis of orientation, and across the axis of orientation. In the case of mark 160, template 166 provides a relatively large correlation rectangle lengthwise along the axis of orientation of the template. The widthwise confidence is much higher, since there is less area for the template to match in the cross-axis orientation. So while the correlation of mark 160 may provide a good estimation of locale in one direction, due to the uncertainty in the perpendicular direction the confidence level in the precise location is less than that provided by the correlation of mark 150.

Returning once more to FIG. 2, step 106 solves for perspective distortion corrections that optimize global landmark mismatch functions, as will be described in more detail in FIG. 8. This step corrects for errors that occur in the dead reckoning of the tile location in the image. The transformation is weighted by the confidence rectangle obtained in the previous step.

Figure 8:
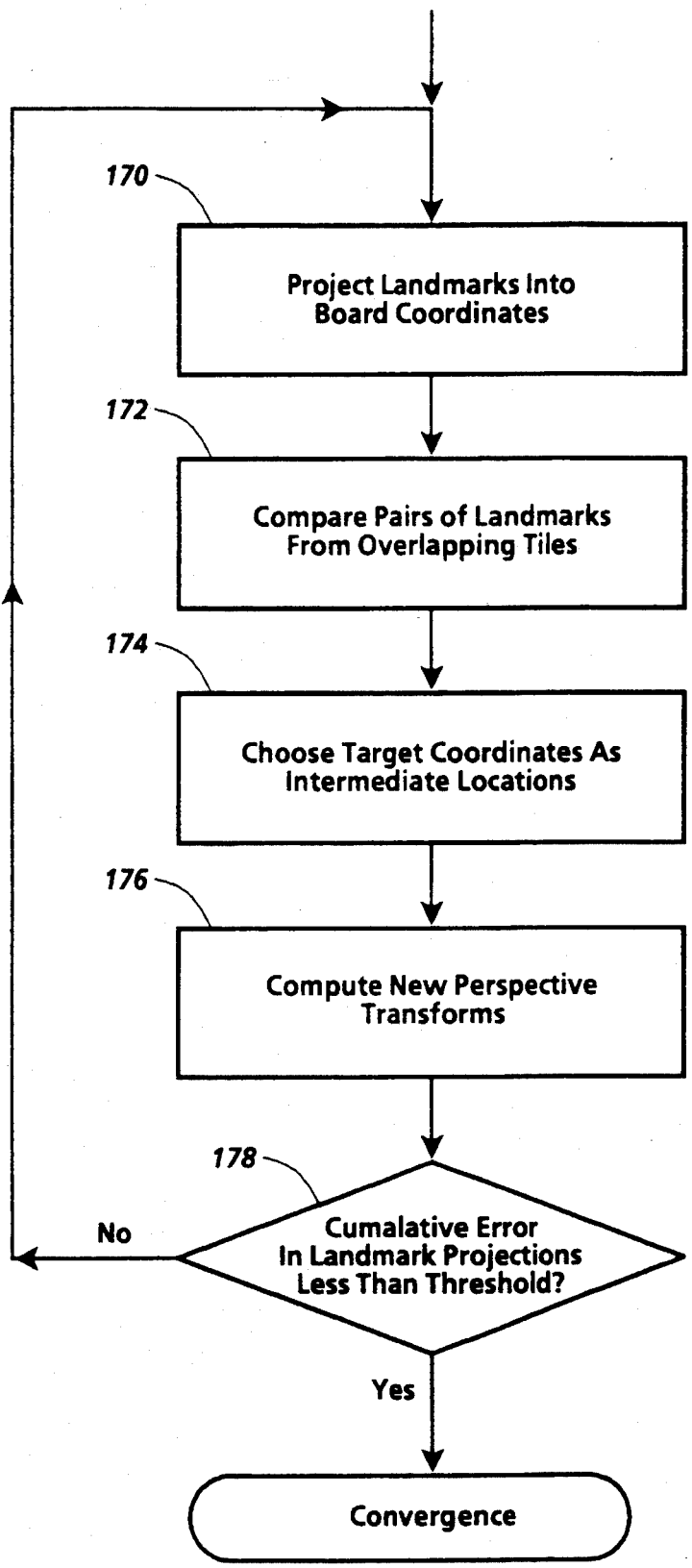
FIG. 8 shows a flowchart which solves for perspective distortion corrections that optimize global landmark mismatch functions.
Figure 9:
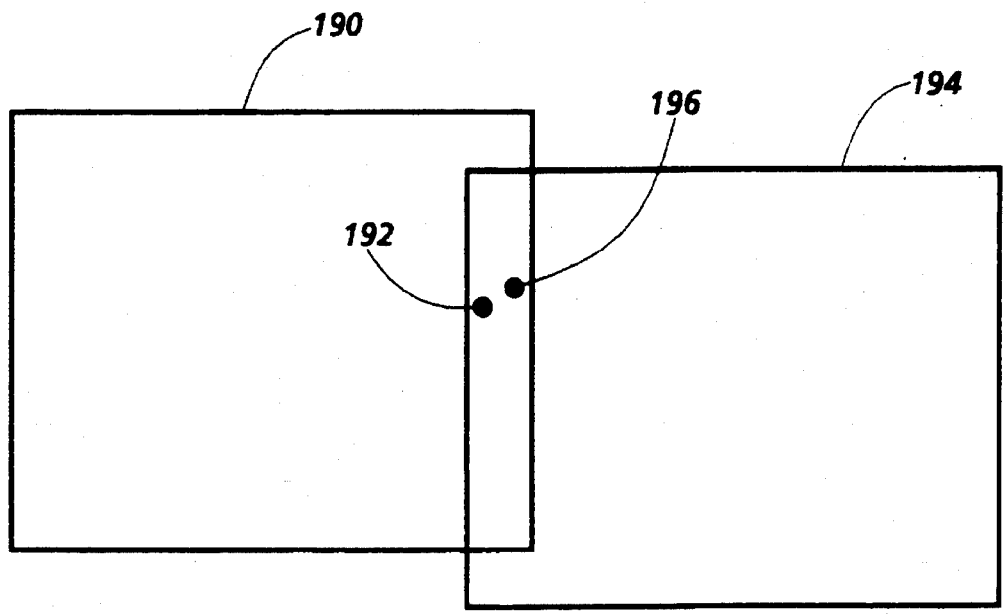
FIG. 9 shows a landmark in the overlap area of two tiles.
Figure 10:
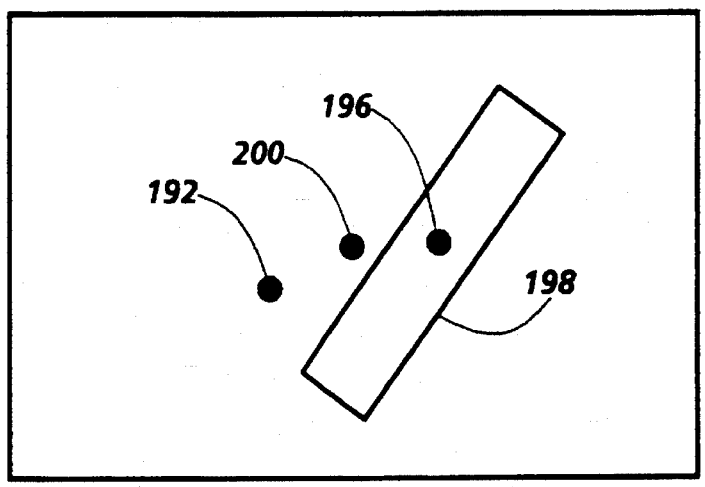
FIG. 10 illustrates the offset of the landmark between the two tiles.

In step 170 of FIG. 8, the landmarks are projected into Board coordinates. The first time this is performed, the dead reckoning data is used to provide the current estimate. In later iterations, the projections are made using the current estimate of the perspective transformation. In step 172, the locations of pairs of landmarks from overlapping tiles are compared, and in step 174, intermediate target locations are chosen. These steps are illustrated in FIGS. 9 and 10. In FIG. 9, a first tile 190 has a landmark 192 identified in its overlap area. In the second tile 194, the corresponding landmark 196 is located. As shown in FIG. 10, landmarks 192 and 196 are slightly offset in their projections into Board coordinates. Surrounding mark 196 is a correlation rectangle, as determined in step 140. An intermediate location, or target location, 200 is selected which is located midway between the confidence rectangles of the first location 192 and the second location 196. The images of both tiles are then transformed to correlate the landmark location more closely with this target location.

It is important to note that in some cases landmarks may be determined which are wrong—that is, the correspondence from the correlation is simply incorrect. These incorrect landmarks should not be included in the weighting. In order to ensure that extraneous marks are not included in the calculation, all landmarks are at first assumed to be correct. If some landmarks is, however, very far off in distance, beyond an acceptable limit, then the landmark is discarded and no longer considered in the calculations.

In addition, artificial mark "points" are placed in the corners of each tile, with a corresponding large confidence rectangle—that is, with low confidence in either direction. These points may be used to locate tiles which have no marks in them, or no landmarks in overlapping areas. The points data is easily overruled by landmark data. The points may also be used if landmarks are determined incorrect.

Step 176 computes new perspective transforms, using a least squares objective measure, which optimally project landmarks in camera coordinates into new target locations in Board coordinates. The transformation may be determined using a general linear transformation in homogeneous coordinates, as described in Mundy and Zisserman. In the formula below, X, Y, and Z are the target coordinates of the landmark in Board coordinates, found by comparing landmarks from overlapping tiles. x, y, and z are camera coordinates.

$$\begin{bmatrix} x \\ y \\ z \end{bmatrix} = \begin{bmatrix} t_{11} & t_{12} & t_{13} \\ t_{21} & t_{22} & t_{23} \\ t_{31} & t_{32} & t_{33} \end{bmatrix} \begin{bmatrix} X \\ Y \\ Z \end{bmatrix}$$

where $t_{33}=1$.

The image coordinates u and v may be found by $$u = \frac{x}{z} \text{ and } v = \frac{y}{z}.$$

Figure 11:
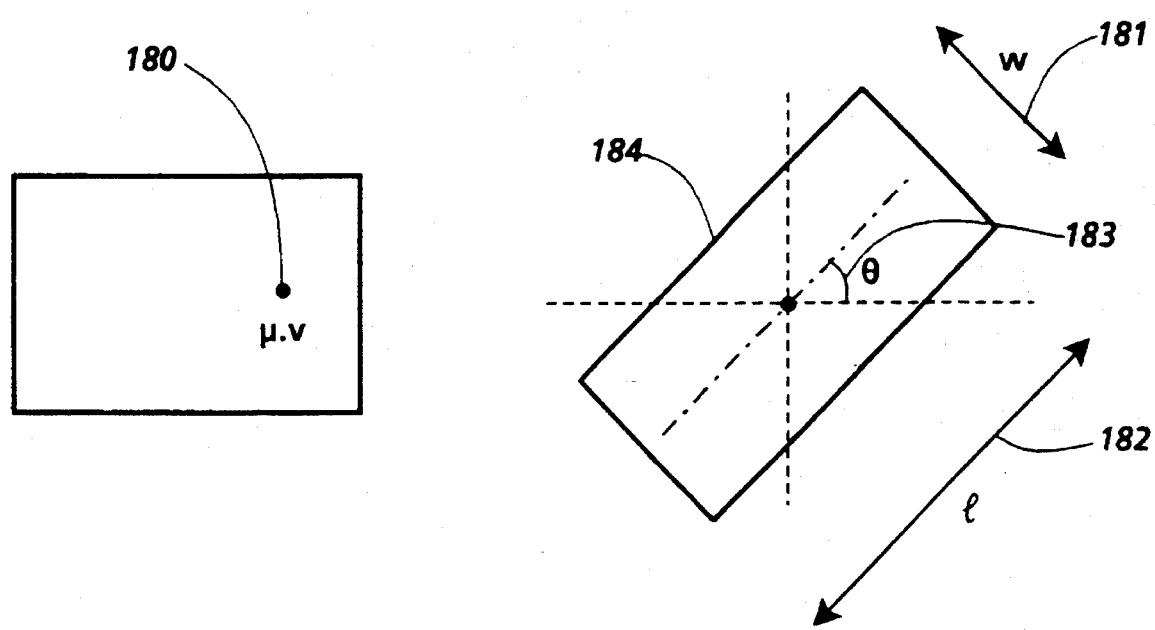
FIG. 11 shows a landmark and corresponding transformation parameters.

To solve for the transformation parameters, a landmark 180 as shown in FIG. 11 is used as an example. The confidence rectangle 184, determined as described in relation to FIG. 7, is defined by the width w 181, the length l 182, and the orientation angle θ 183. Thus the confidence weightings may be derived by $$c_l = \frac{1}{l} \text{ and } c_w = \frac{1}{w}.$$

Solving for the transformation parameters t, an overconstrained system of linear equations is constructed, $$\begin{bmatrix} c_{l_i}X_i\cos\theta_i & c_{l_i}Y_i\cos\theta_i & c_{l_i}\cos\theta_i & c_{l_i}X_i\sin\theta_i & c_{l_i}Y_i\sin\theta_i & c_{l_i}\sin\theta_i & -c_{l_i}X_iu_i' & -c_{l_i}Y_iu_i' \\ c_{w_i}X_i\sin\theta_i & -c_{w_i}Y_i\sin\theta_i & -c_{w_i}\sin\theta_i & c_{w_i}X_i\cos\theta_i & c_{w_i}Y_i\cos\theta_i & c_{w_i}\cos\theta_i & -c_{w_i}X_iv_i' & -c_{w_i}Y_iv_i' \end{bmatrix} \begin{bmatrix} t_{11} \\ t_{12} \\ t_{13} \\ t_{21} \\ t_{22} \\ t_{23} \\ t_{31} \\ t_{32} \end{bmatrix} = \begin{bmatrix} \cdot \\ c_{l_i}u_i' \\ c_{w_i}v_i' \\ \cdot \end{bmatrix}$$

where $u_i' = u_i\cos\theta_i + v_i\sin\theta_i$ and $v_i' = -u_{1i}\sin\theta_i + v_i\cos\theta_i$.

Each pair of rows in the matrix above covers the $i^{th}$ landmark. The transformation parameters may now be solved for using singular value decomposition.

Returning to FIG. 8, in step 178 the new cumulative error in the landmark projections, determined as the difference between the current squared error and the squared error from the last iteration, are tested to fall within a previously determined threshold.

Returning to FIG. 2, step 108 performs perspective corrections on all the tiles using the perspective transformation determined in step 106. In step 110, the corrected data is written into the grey-level Board rendition image. In step 112, the grey-level image is thresholded, producing a binary rendition of the Board image for black and white images, or a color rendition of the Board image in color systems.

The image processing functions required by a system as described above may be expected to be relatively infrequent. Computing resources may be shared in a client server network incorporating several cameras, each transmitting video images to a single server which carries out the image processing operations discussed previously. A computing resource server may be shared with several camera units which may be distributed around a building or scanning different Boards or portions of Boards in a room. Each camera transmits video images to the server, which carries out the image processing operations.

Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

What is claimed:

1. An automatic system for capturing in computational form the image content of an image on a surface, comprising;
   a) a surface upon which is provided an image;
   b) at least one camera subsystem for capturing said image in a matrix of image tiles, each of said tiles comprising at least a portion of the image, said tiles each overlapping adjacent tiles, at least one of said tiles including perspective distortion of the portion of the image;
   c) a processor for receiving and processing said image tiles to combine said tiles to determine a complete computational image corrected for perspective distortion representing said image, the processor determining an overlapping area in each tile overlapping adjacent tiles, finding a mark in each of said adjacent tiles representing a mark in the overlapping area, and combining said tiles based on said mark to produce a single computational image corrected for perspective distortion representing said image, the processor combining said tiles to produce a single computational image corrected for perspective distortion by:
      1) for each two adjacent tiles, determining a region of overlap between a first tile and a second tile;
      2) determining at least a mark in said region;
      3) finding a projection of said at least one mark at a first surface coordinate location in said first tile image;
      4) finding a projection of said mark at a second surface coordinate location in said second tile;
      5) correcting perspective distortion between said first and second surface coordinate locations; and
      6) writing corrected surface coordinates into a representation of said computational image stored in said memory; and
   d) memory accessible by said processor for storing data including instructions for said processor and said computational image corrected for perspective distortion.

2. The system of claim 1, wherein said processor corrects perspective distortion of said surface coordinates of said mark by:
   computing a first perspective transform of said first tile to obtain a first set of transformed surface coordinates according to said first transformed tile;
   computing a second perspective transform of said second tile to obtain a second set of transformed surface coordinates, said second perspective transform weighted by a confidence of said second surface coordinate location according to said second tile;
   determining a difference between said first set of transformed surface coordinates and said second set of transformed surface coordinates;
   wherein said processor repeats said steps of computing a perspective transform of said second tile and determining a difference of said first set of and said second set of transformed surface coordinates until said difference is less than an acceptable threshold.

3. The system of claim 2, wherein the processor further determines a confidence of said second surface coordinate location being in a determined position to said second tile by
   determining an image patch in an area surrounding and including at least a portion of said mark in said first tile;
   correlating said image patch with said mark in said second tile;
   determining a confidence area in said second tile in which said image patch correlates with said mark; and
   determining a lengthwise confidence in a lengthwise orientation of said mark, and a widthwise confidence in a widthwise orientation of said mark;
   said lengthwise confidence and said widthwise confidence being used to weight said second perspective transform.

4. The system of claim 1, wherein said processor processes said tiles by correcting for lightness variation across each tile, determining area in each tile overlapping surrounding tiles, combining said tiles to produce a single intermediate grey-level image, and thresholding said grey-level representation of said image to produce said binary image representing said image.

5. The system of claim 4, wherein said processor combines said tiles to produce a single intermediate grey-level image by:

for each two neighboring tiles, determining a region of overlap between a first tile and a second tile;

determining at least a mark in said overlapping region;

finding a projection of said mark at a first surface coordinate location in said first tile;

finding a projection of said mark at a second surface coordinate location in said second tile;

correcting perspective distortion between said first and second surface coordinate locations; and writing corrected surface coordinates into said intermediate image representation stored in said memory.

6. The system of claim 1, wherein said at least one camera subsystem comprises a single camera rotatable with respect to said surface.

7. The system of claim 1, wherein said at least one camera subsystem comprises a plurality of cameras each in a stationary position with respect to said surface, each scanning an image tile of said surface.

8. The system of claim 1, wherein said at least one camera subsystem comprises a plurality of cameras each in a stationary rotatable position with respect to said surface, each scanning at least one image tile of said surface.

9. A method for providing a complete undistorted computational representation of an image on a surface, the method comprising the steps of:

a) capturing image tiles using at least one camera subsystem, each tile containing a portion of the image, said tiles each overlapping adjacent tiles;

b) converting said image tiles into electronically computational format;

c) determining said overlapping area in each tile;

d) correcting for distortions including perspective distortion in said overlapping area to produce a single computational image by the substeps of:

1) determining landmarks falling in said area of overlap;

2) performing local correlations of image patches in neighborhoods of landmarks to determine corresponding landmark locations in each image tile;

3) projecting said corresponding landmark locations into surface coordinates;

4) comparing pairs of landmarks from overlapping tiles;

5) choosing target coordinates at intermediate locations; and 6) computing new perspective transforms of each tile for said intermediate locations;

wherein said substeps are repeated until convergence upon landmark positions between overlapping tiles represented by cumulative errors in landmark projection being less that a threshold amount.

10. A method for providing a complete undistorted computational representation of an image on a surface, comprising:

a) capturing image tiles using at least one camera subsystem, each tile containing a portion of the surface image, said tiles each overlapping adjacent tiles;

b) converting said image tiles into electronically computational format;

c) correcting for lightness variation across each tile;

d) determining said overlapping area in each tile;

e) correcting for distortions including perspective distortions in said overlapping area to produce a single intermediate grey-level image by the substeps of:

1) determining landmarks falling in said region of overlap;

2) performing local correlations of image patches in neighborhoods of landmarks to determine corresponding landmark locations;

3) projecting said corresponding landmark locations into surface coordinates;

4) comparing pairs of landmarks from overlapping tiles;

5) choosing target coordinates at intermediate locations; and 6) computing new perspective transforms of each tile for said intermediate locations;

wherein said substeps are repeated until convergence upon landmark positions between overlapping tiles represented by cumulative errors in landmark projection being less that a threshold amount; and f) thresholding said grey-level representation of said image to produce an computational image without perspective distortion representing said image.

* * * * *